H. S. VOTAW.
RAILWAY BRAKE.
APPLICATION FILED JAN. 27, 1921.

1,391,224.

Patented Sept. 20, 1921.

Inventor
Homer S. Votaw
By Herbert E. Smith
Attorney

UNITED STATES PATENT OFFICE.

HOMER S. VOTAW, OF CHOPAKA, WASHINGTON.

RAILWAY-BRAKE.

1,391,224. Specification of Letters Patent. Patented Sept. 20, 1921.

Application filed January 27, 1921. Serial No. 440,353.

*To all whom it may concern:*

Be it known that I, HOMER S. VOTAW, a citizen of the United States, residing at Chopaka, in the county of Okanogan and State of Washington, have invented certain new and useful Improvements in Railway-Brakes, of which the following is a specification.

My present invention relates to improvements in railway brakes involving mechanism carried by the railway car, preferably on the truck, which is tripped or actuated by contact with the traction rails when the car wheels or truck are derailed or leave the track. Through suitable connections with the automatic air brake system of the train, including a valve in the air line or train pipe of the air equipment which is operated by this emergency mechanism, the braking system of the train is operated and the brakes applied in usual manner to the wheels of the cars composing the train, to stop the train and prevent further damage or destruction.

To this end the invention consists in certain novel combinations and arrangements of parts of actuating mechanism carried by the car trucks and actuated by contact with the rails as will be hereinafter more fully explained, and in conjunction with the actuating mechanism I employ a guard to prevent undesired actuation of the mechanism by obstructions other than the rails.

In the accompanying drawings I have illustrated one complete example of the physical embodiment of my invention in which the parts are combined and arranged according to the best mode I have thus far devised for the practical application of the principles of my invention.

Figure 1:
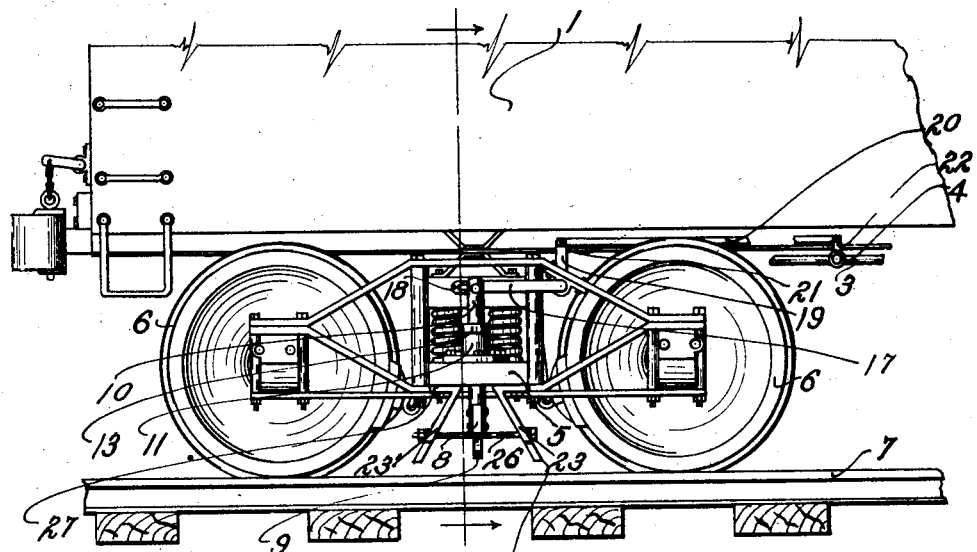

Figure 1 is a view in side elevation at one end of a railway car showing the device of my invention applied thereto, the parts being in normal position.

Figure 2:
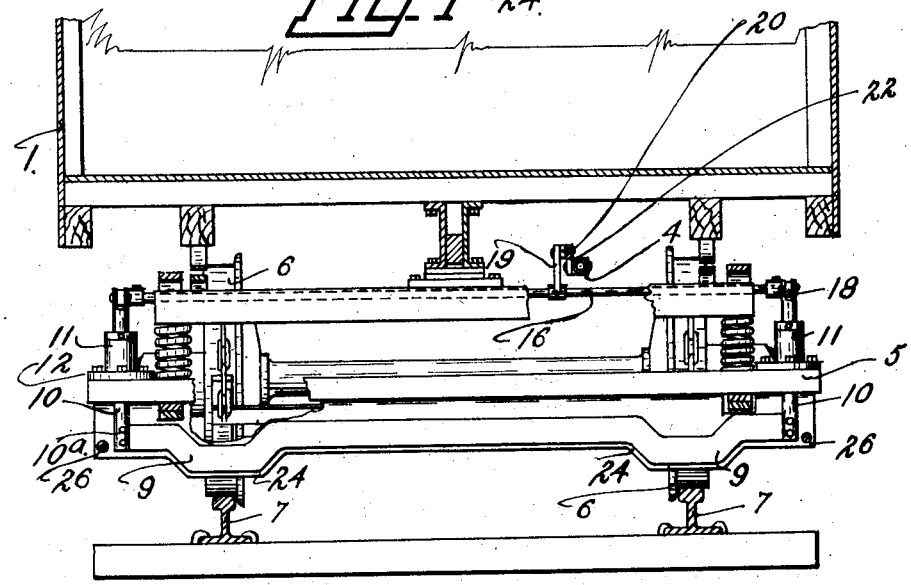

Fig. 2 is a transverse vertical sectional view at line 2—2 of Fig. 1.

Figure 3:
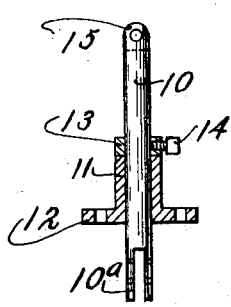

Fig. 3 is a detail view partly in section of the supporting and suspending devices for the contact bar of the emergency mechanism.

In order that the relation of the invention may be readily understood I have illustrated a portion of a railway freight car indicated as 1 which is provided with the usual or standard brake equipment under the bottom of the car, including the train pipe 3, and in the pipe a supplemental control valve 4 is interposed, and which is operated to bring about the required condition for the application of the brakes to the several wheels by discharging the air pressure in the train pipe in the usual manner.

The truck bolster 5 is utilized for the support of the emergency mechanism, and the car wheels 6 and rails 7 are indicated for convenience of illustration.

In carrying out my invention in its physical embodiment I utilize a transversely located contact bar 8, preferably of metal and disposed between the front and rear pairs of wheels of the four wheel truck, extending longitudinally of the truck bolster 5 and directly beneath the bolster. The body of the contact bar is elevated above the track rails, but near its ends the contact bar is fashioned with depending portions or depressions 9 9 situated directly over the rails and spaced apart the distance of the track gage, in order that they may contact with the rails should the truck or wheels leave the track and thus permit the bolster 5 to fall or drop. While the portions 9 are designed to contact with the rails, the body of the contact bar is sufficiently elevated as to prevent contact with portions of the rails or obstructions on the roadbed.

At its respective ends the contact bar is provided with vertically disposed angular supporting rods 10, 10 extending above the bar and outside the wheels, and the bifurcated ends 10ª of these rods fit over the ends of the bar and are firmly riveted or bolted thereto. The supporting rods are suspended and guided in a pair of sleeves 11, one for each rod, which are flanged at 12 and bolted to the top face of the bolster, with the supporting rods passing through the sleeves and through openings in the bolster provided therefor. Above the sleeve each rod has a suspending collar 13 which may be moved to adjusted position thereon and fixed by the set screw or bolt 14 in the collar bearing against the rod, and by means of the collars the rods and bar are supported or suspended with the collars resting on top of the sleeves as shown. Thus the rods and contact bar may be elevated, but cannot be depressed or lowered because of the contact between the collars and sleeves.

The upper ends of the rods are forked at

15 for connection with a rock shaft 16, which at its ends is fashioned with rock arms 17 pivotally connected, as by the slotted connection 18 to the rods, and it will be apparent that as the rods are elevated they will cause the arms to turn and rock the shaft. The rock shaft is journaled below the car bottom, transversely of the car, and is provided with an intermediate crank arm 19 projecting upwardly and vertically therefrom, and by means of the horizontally disposed link 20 pivoted to the crank arm at 21, a flexible connection is afforded between the valve lever 22 and the rock shaft. Now it will readily be evident that as the portions 9 of the contact bar strike the rail, as when the car is derailed or the wheels leave the track, through the above described connections the rock shaft will turn the valve lever to operate the valve, and by suitable connections therefrom and operations of the air brake system, the brakes are applied to the respective car wheels to stop further progress of the train or cars.

In connection with the emergency mechanism I employ a breakable or frangible guard device for the contact bar embodying two guard bars 23, 23' disposed parallel with and located at the front and rear of the contact bar, and of course extended transversely of the car. These guard bars are similar in form to the contact bar and are fashioned with depressions 24, and as seen in Fig. 2 the lower edges of the guard bars project below the contact or lower edge of the contact bar in order that the guard bars may form a shield to prevent the contact bar coming in contact with any obstruction other than the rails. The guard bars are suspended by hangers or arms 23 23' at the side of the truck, and in Fig. 1 it will be observed that these hangers or side arms extend downwardly and diverge outwardly, but are retained by bolts 26 which extend longitudinally of the car and normally hold the guard bars in position. By means of the flanges 27 the hangers or side arms are bolted to the underside of the bolster 5 near its ends as best seen in Fig. 1. The bolted connection between the pairs of side arms or hangers is a breakable one. Thus should the truck or wheels drop from the normal position, the portions 24 of the guard bars will contact with the rails 7, and the weight of the truck will be sufficient to tear the bolted connection loose and spread the diverging side arms of the guard, and as the truck or wheels continue to fall, the contact bar strikes the rails to operate or actuate the emergency mechanism for the purpose described.

From the above description taken in connection with my drawings it will be obvious that I have provided a compactly arranged, simply constructed and reliable emergency mechanism for performing its required functions with celerity and facility, and the broken parts may be repaired at comparatively low cost.

Having thus fully described my invention, what I claim as new and desire to secure by Letters Patent is—

1. The combination with a railway car truck bolster and the air brake equipment including a control valve, of a contact bar adapted to be elevated, and means actuated by the elevation of said bar to control said valve, front and rear guard bars for said contact bar, and breakable connections between said guard bars, for the purpose described.

2. In a device as described, the combination with a liftable contact bar and rigid bolster, of a pair of guard bars having diverging, end, hangers attached to said bolster, and a breakable connection between said pairs of hangers for the purpose described.

In testimony whereof I affix my signature.

HOMER S. VOTAW.